March 28, 1944.         T. P. BACON                2,345,172
                    TIRE RETREADING APPARATUS
                    Filed Sept. 29, 1941         3 Sheets-Sheet 1
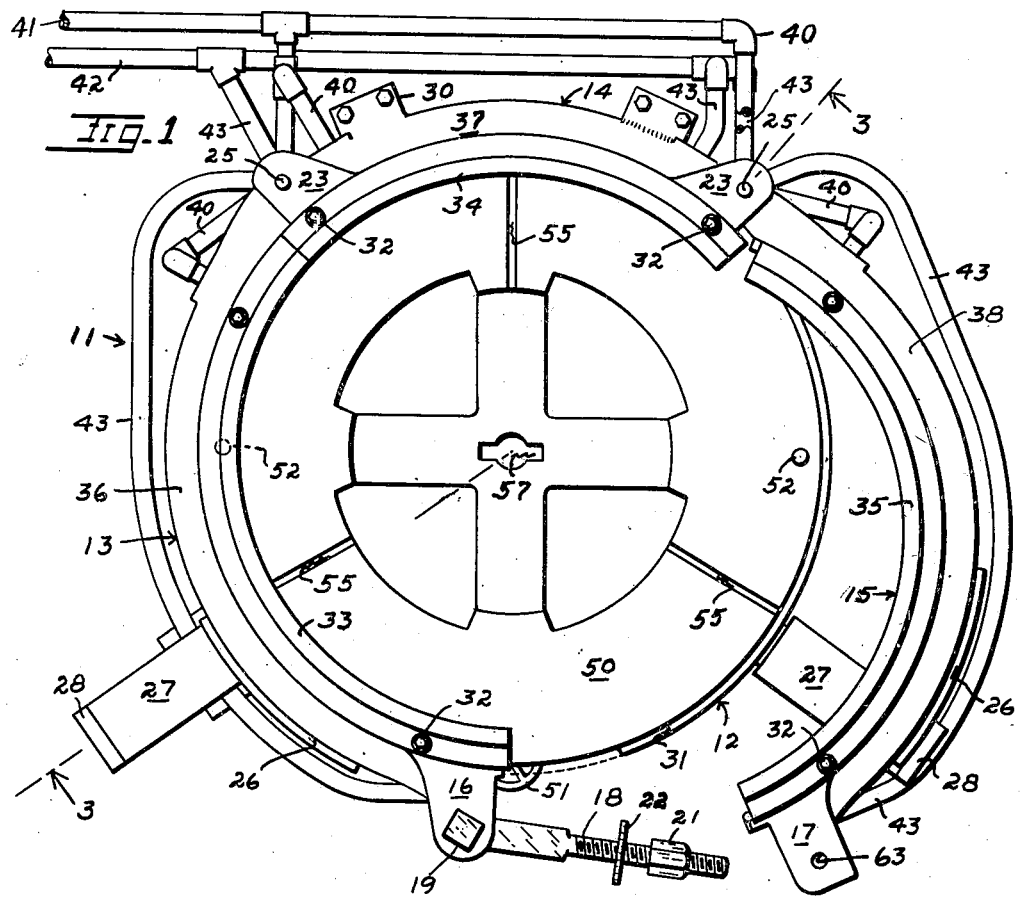
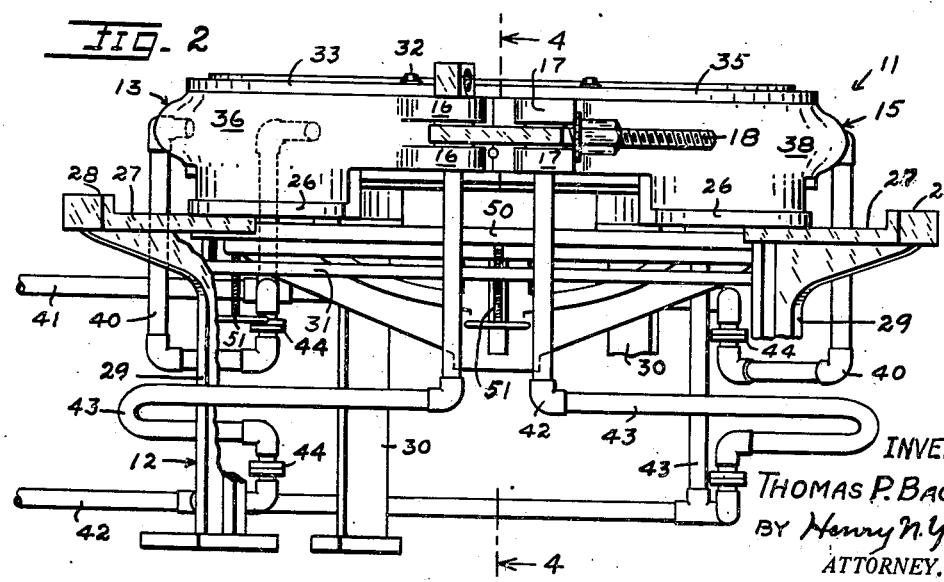
INVENTOR
THOMAS P. BACON
BY Henry N. Young
ATTORNEY.

March 28, 1944. T. P. BACON 2,345,172
TIRE RETREADING APPARATUS
Filed Sept. 29, 1941 3 Sheets-Sheet 2
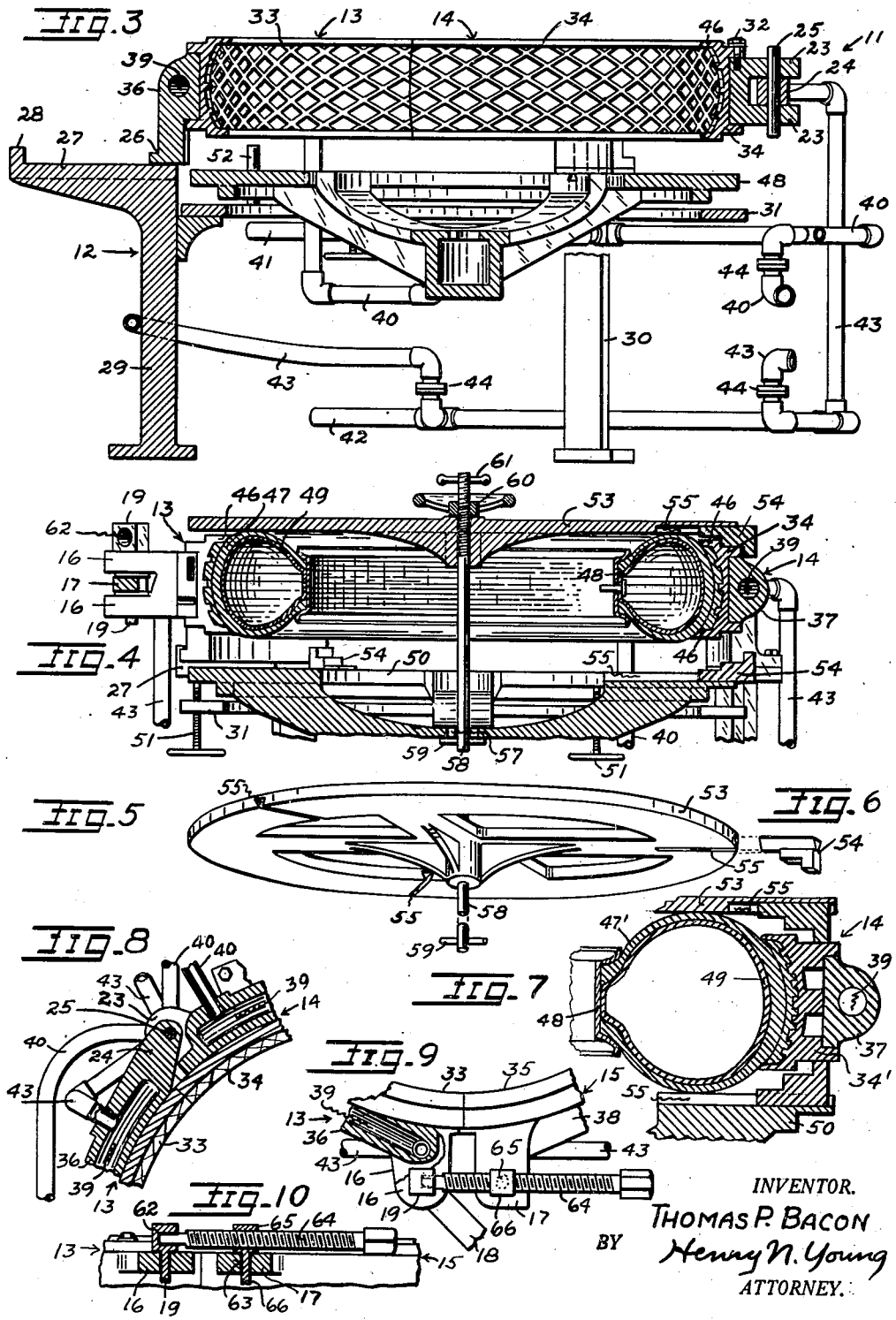

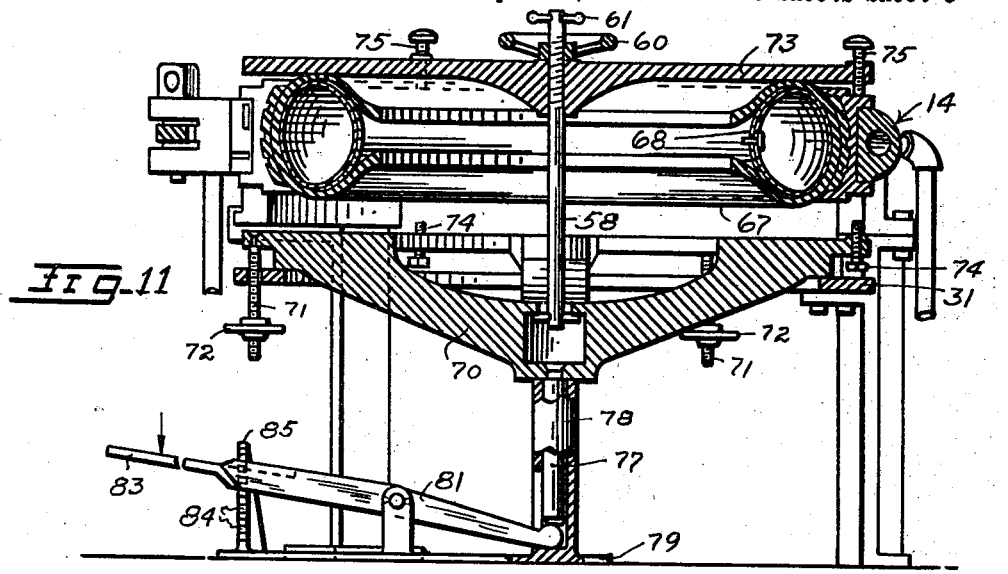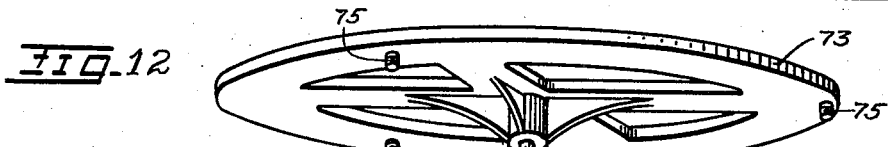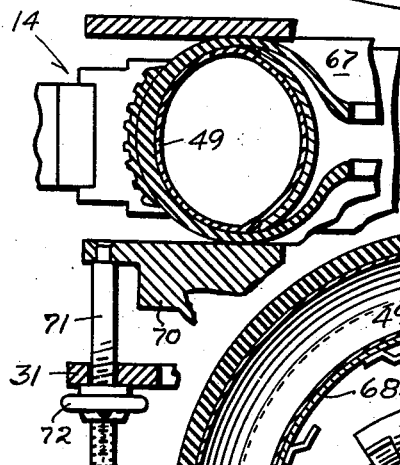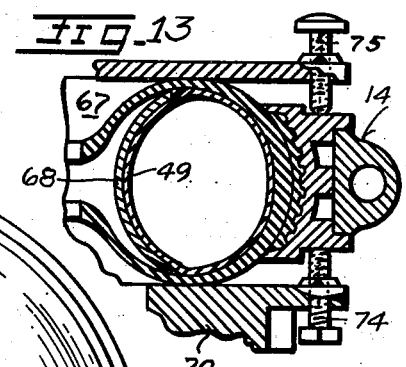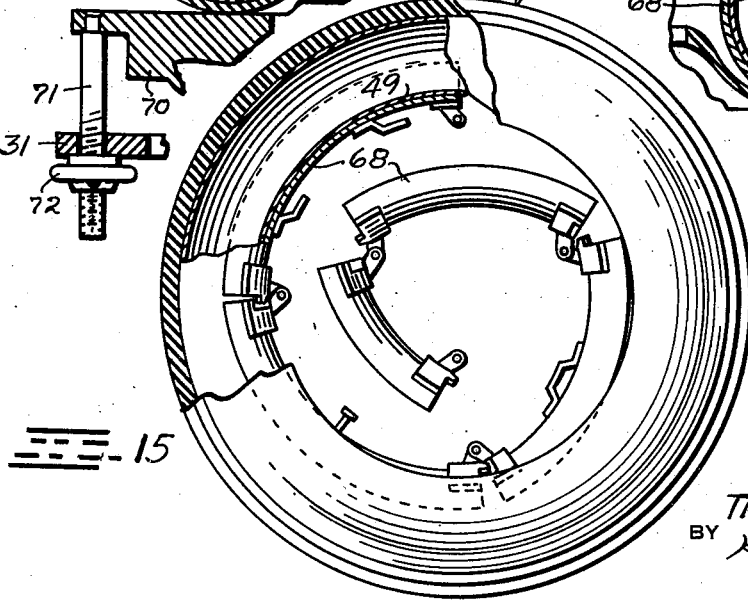

Patented Mar. 28, 1944

2,345,172

UNITED STATES PATENT OFFICE 2,345,172

TIRE RETREADING APPARATUS

Thomas P. Bacon, Oakland, Calif.

Application September 29, 1941, Serial No. 412,899

17 Claims. (Cl. 18—18)

The invention relates to an apparatus for retreading pneumatic tires, and the present application comprises a continuation in part of my copending application Ser. No. 84,155, filed June 8, 1936.

An object of the invention is to effect a retreading of a pneumatic tire while the same is in its normal form at its tread portion.

Another object is to provide a sectional mold in which all parts thereof are constantly supported in unitary association.

A further object is to provide a sectional retreading mold having mutually hinged sections which are arranged for relative swinging solely in the plane of its circle for opening and closing the mold.

An added object is to provide such hinged connections at the joints between the mold sections that a pinching of the tire tread thereat is avoided as the mold is closed about a tire therein.

Yet another object is to provide for an individual steam heating of the different mold sections.

A still further object is to provide removable and interchangeable matrix portions for the sections whereby the retreading of tires of different sizes may be effected merely by using different sets of matrices in the mold.

Still another object is to provide an improved method and means for initially positioning a tire in the mold and subsequently preventing its sides spreading under pressure beyond normal during the forming and vulcanizing and curing of the new tread while centering the tire in the mold.

A further object is to provide an improved means for opening the mold to release a tire thereof after its retreading is effected.

The invention possesses other objects and features of advantage, some of which, with the foregoing, will be set forth or be apparent in the following description of a typical embodiment of the apparatus, and in the accompanying drawings in which, Figure 1 is a plan view of one embodiment of the apparatus, a sectional mold thereof being shown as partly open.

Figure 2 is a front elevation of the apparatus, the mold being closed.

Figure 3 is a sectional elevation taken on the borken line 3—3 in Figure 1.

Figure 4 is a sectional and fragmentary elevation on the line 4—4 in Figure 2, a tire being shown in the mold and an upper plate element of a tire-centering device being shown as disposed in operative position in the mold and with respect to the tire.

Figure 5 is an underneath perspective view of an upper centering plate and a draw bolt associated therewith.

Figure 6 is a perspective view of a stepped spacing block of the centering device.

Figure 7 is an enlarged fragmentary section corresponding to a portion of the showing of Figure 4 and illustrating the elements of the tire-centering device in operative association with a tire of a different size than that shown in Figure 4.

Figure 8 is a fragmentary horizontal section at a connecting hinge of the mold and at the central mold plane.

Figure 9 is a fragmentary and partly sectional plan view at the front of the mold and discloses a mold-opening means of the apparatus.

Figure 10 is a fragmentary section at 10—10 in Figure 9.

Figure 11 is a view taken generally as Figure 4 and disclosing certain modifications of the apparatus of Figures 1 to 10.

Figure 12 is a perspective view corresponding to Figure 5 and showing a modified form of the upper centering plate shown in Figure 11.

Figure 13 is an enlarged fragmentary section corresponding to Figure 7.

Figure 14 is an enlarged view taken in the plane of the section of Figure 13 and at the opposite side of the apparatus therefrom.

Figure 15 is a sectional view taken at the central plane of a tire and illustrating the manner of installing or removing a collapsible ring element which is utilized therein during the retreading operation.

The embodiment of the present tire-retreading apparatus disclosed in Figures 1 to 10 essentially comprises a continuous and sectional mold 11 and a unitary frame 12 for constantly supporting the mold in horziontal disposition for its application and use in vulcanizing a rubber tread on and to the prepared carcass of a pneumatic tire. The arcuate mold sections 13 and 14 and 15 abut and interfit at radial planes which include the mold axis. The sections 13 and 15 are of like arcuate length and are hinged to the different ends of the section 14 whereby the sections are arranged for relative swinging in the plane of the mold and about pivotal axes which are parallel to the mold axis.

Preferably, and as shown, the arc of the mold section 14 is of the order of 98 degrees, whereby the arcs of the sections 13 and 15 are of the order of 131 degrees each. A mold-closing means is provided for operation at the free ends of the sections 13 and 15 for forcibly drawing and locking the ends together while a tire carrying a pehipheral strip of initially unvulcanized tread rubber around its road-engaging portion is disposed in the mold. As shown, the mold-closing means comprises a draw bolt assembly which is operative between a pair of ears 16 extending outwardly from the mold section 13 at opposite sides of the central mold plane, and a pair of similarly disposed ears 17 extending outwardly from the opposed and complementary end of the section 15.

As particularly illustrated in Figures 1 and 2, the draw-bolt assembly comprises a bolt 18, a headed pivot pin 19 removably engaged through registering bores in the ears 16 and in the bolt head when the latter is disposed between the ears, and a nut 21 mounted on the bolt and operative against back edges of the ears 17 on the section 15 when the nut is screwed up on the bolt to draw the opposed section ends into contact against the radially acting resistance of a tire within the mold. A washer 22 may be mounted on the bolt for interposition between the nut 21 and the ears 17.

It will now be noted that initial placement of a tire in the mold requires a swinging of both of the sections 13 and 15 in the mold plane and out of the mold circle whereby to permit the insertion of a tire within the circular mold space defined at the inner faces of the mold sections. If the pivotal axes at the connecting points of the mold sections should lie in the planes of separation of the molds, adjacent sections will tend to grip and pinch a tire tread portion between the mutually opposed ends of the sections as the mold is closed; to avoid this difficulty, I preferably dispose said pivotal axes circumferentially inwardly of the ends of the mold section 14 and radially outwardly of the mold space.

As shown, pairs of ears 23 extend radially outwardly from the end portions of the section 14 at opposite sides of the central mold plane and receive an ear 24 of a section 13 or 15 between them. Hinge pins 25 engage registering bores in the ears 23 and 24, it being noted that the pins 25 are approximately 85 degrees apart in an arc which extends therethrough and is concentric with the mold axis. In this manner, the inner end edges of the sections 13 and 15 which are designed to register with the corresponding edges of the section 14 are arranged to move radially inwardly to their final position as the mold closing is concluded, and pinching of the unvulcanized tread rubber between the sections as the swinging section approaches its operative position in the mold circle is avoided.

Referring to the assembly of the mold sections, it is noted that the section 14 is fixedly related to the frame 12, and depending foot portions 26 of the sections 13 and 15 supportedly and slidably rest upon radial arms 27 of the frame 12 whereby the various sections are arranged to be retained in co-planar relation as the sections are swung relatively to each other. It will be understood that the upper faces of the arms 27 are arranged to function as slide plates for the sections 13 and 15 which are movable thereover as they are swung in or out. Stops 28 may be provided at the outer ends of the frame arms 27 to limit the outward swinging of the mold sections 13 and 15 thereover.

As shown, the frame 12 comprises a pair of front legs 29 and a pair of rear legs 30. The legs 29 provide the radial arm portions 27 of the frame at their upper ends, and the mold section 14 is fixed to the legs 30 at the top thereof. An annular plate 31 is fixed to and between the legs 29 and 30 intermediately thereof and in horizontal disposition for completing the unitary frame structure, it being understood that other members might also be provided for connecting the legs.

It will now be noted that the mold sections 13 and 14 and 15 respectively include matrix portions 33 and 34 and 35 whose inner faces are formed in generally complementary shape to the tire tread to be molded thereat. As illustrated, the matrix portions are outwardly flanged at their sides to define grooves which respectively receive outer portions 36 and 37 and 38 respectively of the mold sections 13 and 14 and 15. Suitable stud bolts 32 extend through the side flanges of the matrix portions and into the outer mold portions for releasably fixing the matrix portions in their places. It is noted that the mold portions 36 and 38 respectively provide the ears 16 and 17 of the mold-locking device, and further provide the hinge ears 24. The portion 37 provides the hinge ears 23 for cooperation with the hinge ears 24.

Each of the outer mold portions 36 and 37 and 38 is arranged to be steam heated for heating the matrix portion carried thereby, both of said portions of a mold section preferably being of metal; in practice the matrix portions may be of an aluminum composition while the outer portions are hollow and the cavities 39 thereof are each suitably connected in a steam circuit whereby said portions provide steam jackets from which heat may be conducted to the matrix for effecting the vulcanizing of a tire tread which contacts it. In the present structure, pipes 40 connect one end of each of said jackets with a steam supply pipe 41, and pipes 43 connect the other ends of the jackets with a steam return pipe 42. As illustrated, each of the pipes 40 and 43 which is connected with a movable mold section 36 or 38 has a portion thereof which is coaxial with the corresponding hinge pin 25 and includes a swivel joint 44; in this manner, ordinary metallic pipes may be used for the necessary connections. By independently supplying the different mold sections with steam instead of connecting their jackets to provide a continuous jacket around the mold, any necessity for steam-tight joints at abutting sections ends is avoided.

The present apparatus is particularly designed for molding and vulcanizing a tread on a tire while the tire maintains the form which it normally has when inflated. To this end the like mold faces of the matrix portions are preferably concave as shown whereby a tread of substantially uniform thickness may be provided on the road-engaging portion of a tire therein. At the opposite sides of the mold faces, flanges 46 extend radially inwardly to contact side walls of the tire 47 to be retreaded whereby the new tread material is kept from a lateral spreading around the tire and the side walls of the tire remain as originally provided. This device of applying a new tread only at the working face of the tire is known in the art as "capping" and requires a minimum amount of new tread material.

In preparing a worn tire 47 for retreading with the present apparatus, the remainder of the old tread is first ground to provide a tire section of uniform cross-section at the road-engaging, or crown, portion of the tire. A strip of unvulvanized rubber of the width required for a particular matrix is then secured circumferentially about the tire, said strip usually being of rectangular cross-section. With the tire 47 mounted on a demountable metal wheel rim 48 in the usual manner and having an inflatable inner tube 49 therein in which a relatively low air pressure exists, the tire is disposed within the open mold in the plane thereof and the heated mold is then closed. When the mold has been closed, the air pressure in the tube is increased to a value of considerably above the normal working pressure for the tire whereby the strip of new tread rubber is forced in softened condition into the opposed matrix face for its shaping and vulcanizing and curing in a well understood manner.

Means are preferably provided for assuring a proper initial disposition of a tire being retreaded in the apparatus. As is shown, a plate 50 is adjustably mounted on and above the frame plate 31, the former plate being supported on a plurality of screws 51 threadedly engaged in the plate 31 and normally bearing against the lower side of the plate 50. When a tire is first placed within the open mold it may be supported on the plate 50 which is adjusted to appropriately position the tires in mutually co-planar relation with the mold by use of the screws 51. While the tire is centered in the closed mold, the plate 50 may be lowered clear of the tire, this position being illustrated in Figure 4. Pins 52 are fixed in the frame plate 31 and extend upwardly and freely in openings provided in the plate 50 for maintaining the co-axial alignment of the plates 31 and 50.

Recalling the fact that the new tread should preferably be molded and vulcanized while the tire is in its normal working form, the application of the excess air pressure within the tire during vulcanizing and curing may tend to unduly widen the tire transversely of its plane whereby the pressure therein is less effective as a tread-shaping means and the tire carcass may even become ruptured and/or burst. This possible difficulty may be avoided by the use of the plate 50 in cooperation with a second plate 53 at the other side of the tire to prevent an unduce transverse widening of the tire during the tread-molding process.

It will be understood that the cooperative use of the plates 50 and 53 is preferably such that the tire is not deformedly compressed between the plates but is limited to a normal transverse widening thereof as the pressure is applied within the tire. Preferably, and as brought out in Figure 7, the plates 50 and 53 are arranged to bear against the matrix sides for positively controlling their spacing. The plates 50 and 53 may engage the opposed matrix sides directly or suitable spacing members may be operatively interposed between the matrix and the plates at spaced points around the matrix. In this manner, the mutual spacing of the plates 51 and 53 may be positively limited to the normal width of a tire being treated in a given sectional matrix and the tire is positively centered in co-planar relation with the mold.

As particularly illustrated, the upper and under faces respectively of the plates 50 and 53 are provided with radial dovetail grooves 55 which receive the complementarily formed base portions of spacing blocks 54, there being three blocks provided at each plate. The blocks 54 may be stepped, as illustrated, whereby the mutual spacing of the plates 50 and 53 may be varied as desired or required.

Means are preferably provided for clamping the plates 50 and 53 against the opposite mold faces whereby they may be fixedly related to the mold. As shown, the lower plate 50 is provided with a double keyhold opening 57 for receiving therethrough a bolt 58 having a pin 59 extending transversely through its lower end. The upper end portion of the bolt 58 is threaded and mounts a hand-wheel nut 60 for bearing engagement with the top of the plate 53.

When the lower plate 50 has been adjusted upwardly to its desired limiting position as determined by its engagement with the mold, either directly or through spacing blocks 54, the bolt 58 may be inserted through the opening 57 and rotated through a 90 degree angle to prevent its withdrawal, after which the hand-wheel nut 60 is turned down on the bolt until both plates are clamped to the mold matrix as determined by the positions of the spacing blocks 54 associated with it. For facilitating the anchored engagement of the bolt 58 with the plate 50, the upper bolt end may carry a handle bar 61 extending radially from the bolt. It will be understood that the plate 53 and the bolt 58 and the nut 60 provide an assembly which is handled as a unit and is removed during the placement and removal of a tire.

It will now be noted that the matrix portions 33 and 34 and 35 are removably maintained on the mold portions 36 and 37 and 38 respectively whereby they may be replaced with matrix portions of different radial thickness and/or providing different tread designs. In this manner the retreading of tires of different diameters and/or different widths may be effected in the same apparatus merely by replacing the matrix members. This is illustrated in Figure 7 wherein a tire 47' of greater width and less diameter than the tire 47 is disposed in the mold against a matrix 34' which is mounted within the outer mold section and in fitted engagement with and between the plates 50 and 53, the spacing blocks 54 being differently disposed with respect to the plates than in Figure 4.

After the tire tread has been molded and vulcanized and cured on a tire in the present apparatus, it may be necessary to forcibly open the mold by reason of the close fit of the cured tread with the matrix. For opening the mold under these conditions, a special device has been provided, the same being shown in Figures 9 and 10. By reference to Figures 2 and 9 and 10 it will be noted that the head of the pivot pin 19 for the bolt 18 is provided with a radial socket 62 and the ears 17 of the mold section 15 are perforated at 63 axially of the mold. The mold-opening means comprises a bolt 64 threadedly engaged through the head 65 of a pin 66 which may be inserted within the opening 63. One end of the bolt 64 is reduced for rotative engagement in the socket 62 whereby an appropriate rotation of the bolt 64 by the application of a wrench to its head may forcibly separate the mold sections 13 and 15 to initiate the opening of the mold for the removal of the tire. It will be noted that the mold-opening device now described may be installed and used when the draw-bolt 18 is swung from between the ears 17 as in Figures 1 and 10, whereby the latter bolt need not be dismounted. The bolt 64 is understood to be operative as a jack screw or jack bolt.

Referring now to the additions and modifications disclosed in Figures 11 to 15, it will be noted that the disclosures specifically relate to the use of an element 68 within a tire 67 in lieu of mounting a wheel rim 48 on the tire, and to a modified stop means for bottom and top plates 70 and 73 which operatively and respectively correspond to the plates 50 and 53 of the first embodiment. In describing and showing the alternative structures, those structural elements which are used without change are designated by the same reference characters as before.

By particular reference to Figures 13 to 15, it will be noted that the element 68 comprises a ring-like member for fitted engagement in and across the tire casing where its bore has its greatest width axially of the tire. The axial width of the ring is preferably that for the bore of the casing when the tire is normally inflated for use, and the ring is preferably concave at its outer face and of crescent cross-section. The inner tube 49, which is inflatable for creating the required super-normal pressure behind the tread portion of the tire casing, is installed between said tread portion and the ring 68 whereby the pressure required at the tread portion of the tire during the recapping operation is operative to create distending strains only in the tire casing portion beyond the lines of engagement of the ring edges with the casing bore, it being noted that said lines are opposite the zones of action of the plates 70 and 73, and at the widest part of the casing bore. It will be understood that the use of the ring 68 prevents the application of the supernormal working pressure behind the relatively weak and unbacked casing portions between the lines of engagement of the rings and the tire beads, this constituting one important advantage resulting from the use of a ring 68. Obviously, different sized rings 68 would be provided for tires of different sizes just as the matrices are provided.

Particularly for small tires, the usual mounting rims are not collapsible and the mounting of a tire thereon requires the more or less difficult and time-consuming stretching of its beads over a rim side. As brought out in Figure 15, the present ring 68 is formed with hingedly related sections which are arranged to permit its expansion or collapse within a tire casing with very much less time and effort than would be required for mounting the tire on a wheel rim 48; this constitutes another advantage arising from the use of a ring 68 in the manner taught. A further advantage of the use of the ring 68 lies in the fact that this element, when inserted in the tire to be retreaded with the present apparatus, acts positively as a stop against any tire-deforming compression of the tire between the plates 70 and 73 should the positioning stop means provided for these plates be erroneously set, or not used at all.

The stop and positioning means of Figures 11 to 14 replaces the provision and use of the support screws 51 and the spacing blocks 54, and essentially comprises a temporarily operative jack arrangement for lifting the plate 70, a stop device reactive between the movable plate 70 and the fixed frame plate 31 to adjustably limit the lifting of the plate 70, and adjustable stop screws carried by the lower and upper plates 70 and 73 respectively and operative against the matrix elements to limit the movements of the plates toward a tire in the mold in the manner taught for the blocks 54.

Stud bolts 71 depend from the plate 70 and are slidingly engaged through complementary vertical holes provided through the fixed frame plate or ring 31. Nuts 72 are mounted on the bolt 71 below the plate 31 whereby said nuts may engage the under side of the latter plate to limit the upward raising of the plate 70. As is brought out in Figure 14, the bolts 71 are provided with calibration marks as indicating the position of the nuts thereon, the marks of the different bolts being alike with respect to the upper and tire engaging face of the plate 70 for use in setting said face at a distance equal to one-half the thickness of a tire below the central plane of the matrix to be used.

At least three stop screws 74 are threadedly mounted at equally spaced points of the edge of the lower plate 70 for the engagement of their upper ends with the under side faces of the matrix sections of the mold. The stop screws 74 are calibrated with respect to the plates 70 whereby they may be adjustably set to extend like distances above the mounted plate for limting its upward movement as the nuts 72 on the bolts 71. It will be noted that the stops 74 for engaging the movable matrix sections may function only when the mold is closed, whereas the stop nuts 72 may function while the mold is open and for limting the elevation of the plate 70 to center the supported tire in the mold plane as a prerequisite to the closing of the mold about the tire. Since the present stop nut arrangement operates from the frame ring 31, and not directly upon the matrix, the screws 74, which are operative only after the mold is closed, are arranged to supplement or replace the action of the stop nuts 72 for limiting the upward raising of the plate 70.

The upper plate 73 threadedly carries stop screws 75 corresponding to the stop screws 74 and arranged for the engagement of their lower ends with the upper side faces of the matrix sections when the plates 70 and 73 are drawn together by the action of the bolt 58 to grip the matrix between them. These stop screws are calibrated complementarily to the bolts 71 and stop screws 74, whereby like readings on the bolts 71 and screws 74 and 75 may indicate a centering of the plate assembly with respect to the mold plane in terms of the particular size of the tire being recapped. It will be understood that the significance of the gauged settings of the stop nuts 72 and stop screws 74 and 75 with respect to a centered disposal of tires of different size in the mold to render the plates 70 and 73 operative would be known to an operator of the apparatus, and that the various stop elements may be preset in accordance with an established and tabulated designation of matrices and corresponding stop settings for tires of different sizes. Having the nuts 72 appropriately positioned on the bolts 71, and the screws 74 and 75 correspondingly set in the plates 70 and 73, the plate 70 is lifted vertically and held raised by a suitable accessory means until the mold is closed and the tension bolt 58 has been engaged to support the plate 70 from the plate 73 in the manner described for the support of the plate 50 from the plate 53, after which the bolt 58 may be tightened to secure the plates against the matrices.

A suitable jack or hoist may be provided for initially lifting the plate 70 to or adjacent its limiting raised position; as particularly brought out, a stem 77 depends integrally and axially from the plate 70 and slidably engages in the bore of a sleeve 78 extending from a fixed base 79. A foot lever 81 is intermediately pivoted on the base 79 and has one end extending through an upright slit in the sleeve 78 and engaging beneath the stem 77. The other end of the lever 81 is provided with a foot pedal 83 for depression to effect a corresponding lifting of the stem 77 and the plate 70. If desired, the lever 81 may be releasably held in plate-lifting position; as shown, the depressed pedal end of the lever may be selectively swung into detent notches 84 provided on a member 85 extending upwardly from the base 79. In this manner, the plate 70 may be raised and be held raised until the bolt 58 is operatively installed for drawing the plates 70 and 73 toward each other to the limit imposed by the described stops. It will be noted that the present stop arrangement markedly facilitates the initial centralized setting of a tire in the mold, and that the present stop nut and screw elements are not apt to be dislodged from their settings during the manipulations of the plates 70 and 73 incident to the use of the apparatus.

From the foregoing description taken in connection with the accompanying drawings, the advantages of the construction and method of operation will be readily understood by those skilled in the art to which the invention appertains. While I have described the features and the principles of operation of structures which I now consider to be preferred embodiments of my invention, I desire to have it understood that the showing is primarily illustrative, and that such changes may be made, when desired, as fall within the scope of the following claims.

I claim:

1. In a tire treading apparatus, arcuate mold sections cooperative in a horizontal plane to provide a continuous vulcanizing mold and hingedly connected for relative swinging in the plane of the mold circle to open and close the mold, and a supporting frame providing relatively fixed members directly and constantly engaging all of the sections to support the mold assembly in horizontal disposition at all times.

2. In a tire treading apparatus, a series of three arcuate mold sections cooperative to provide a full circle mold assembly, one mold section being relatively fixed and having the other two sections hingedly connected to its ends for swinging relative to the first in the plane of the mold circle to open and close the mold, and a supporting frame providing relatively fixed members directly and constantly engaging all of the mold sections to support the mold assembly with its plane substantially horizontal, said fixed mold section being secured to one said frame member and the other mold sections having a sliding engagement with the members which support them.

3. In a tire treading apparatus, a series of three mold sections cooperative in a substantially horizontal plane to provide a full circle mold and having end faces abutting in planes including the mold axis, one said section being relatively fixed, means hinging the other two sections to the first section for swinging outwardly of the mold circle and about axes which are parallel to the mold axis and lie outwardly of the mold circle at equal distances therefrom and between the planes of the end faces of the intermediate section at equal distances from said faces, and a supporting frame having relatively fixed members directly and constantly engaging all of the mold sections to support the mold assembly in horizontal disposition at all times.

4. In a tire treading apparatus, a series of three mold sections cooperative in a substantially horizontal plane to provide a full circle mold and having end faces abutting in planes including the mold axis, one said section being relatively fixed, means hinging the other two sections to the first section for swinging outwardly of the mold circle and about axes which are parallel to the mold axis and lie outwardly of the mold circle at equal distances therefrom and between the planes of the end faces of the intermediate section at equal distances from said faces, and a frame operative to support the entire mold assembly in horizontal disposition at all times.

5. In apparatus for retreading a pneumatic tire, a full circle mold openable in its plane for engaging solely the tread portion of a tire and extending axially for less than the full tire width, a frame fixedy mounting the mold in a horizontal position, a plate element disposed opposite the under side of the mold and providing a flat bearing face for direct flat engagement with the under side face of a tire in the mold, support members adjustably engaging the frame and arranged to cooperatively support said plate element beneath the mold and coaxial therewith, said plate element providing the entire support of a deflated tire thereon in the mold plane when the mold is open, and spacing blocks arranged between the plate and the under side of the closed mold and operatively engaging the plate and mold to provid a spacing between the bearing face of the plate and a horizontal plane extending centrally through said mold equal to half the normal width of the tire when it is inflated.

6. In apparatus for retreading a pneumatic tire, a full circle mold openable in its plane for engaging solely the tread portion of a tire and extending axially for less than the full tire width, a frame fixedly mounting the mold in a horizontal position, a plate element disposed opposite the under side of the mold and providing a flat bearing face for direct flat engagement with the under side face of a tire in the mold, support members adjustably engaging the frame and arranged to cooperatively support said plate element beneath the mold and coaxial therewith, said plate element providing the entire support of a deflated tire thereon in the mold plane when the mold is open, a plate element similar to the first overlying the mold, a tension means connecting the plate elements to urge them toward each other and against the opposite sides of the tire, and spacing members arranged between the plate elements and the opposed sides of the closed mold and operatively engaging said elements and mold to provide a spacing between the tire-engageable plate element faces which is no less than the tire width when the tire is inflated for use.

7. A structure in accordance with claim 6 wherein the spacing members comprise stepped blocks removably mounted on the plates whereby to vary the distance between the plates and mold when the tension means is operative between the plates for the similar accommodation between the plates of tires of different widths.

8. In apparatus for use in recapping a pneumatic tire, a full-circle heated vulcanizing mold engaging solely the tread portion of a tire and extending axially for less than the full tire width, unheated plate elements disposed opposite the mold sides and providing mutually opposed flat faces arranged for a direct and line engagement by the sides of a tire in the mold while axially spaced from the mold, a tension bolt means directly connecting the plate elements, and spacing members operative between the plates and the opposed sides of the mold to provide a mutual spacing of the said plate faces which equals the normal tire width when the tire is inflated for use.

9. In apparatus for use in recapping a pneumatic tire, a vulcanizing mold having a heated matrix for peripherally engaging solely the tread portion of a tire in the mold and extending axially for less than the full tire width, unheated plate elements disposed opposite the matrix and tire sides and providing mutually opposed flat faces arranged for a direct and line engagement thereof by the sides of the tire while axially spaced from the mold, and means directly cooperative between the matrix and the plates to provide a centered spacing of the said plate faces with respect to the central plane of the tire such that said spacing equals the normal tire width when the tire is inflated for use.

10. In apparatus for use in recapping a pneumatic tire containing an inflated tube for supernormal inflation during recapping, a vulcanizing mold having a heated matrix for peripherally engaging solely the tread portion of a tire in the mold and extending axially for less than the full normal tire width, unheated plate elements disposed opposite the matrix and tire sides and providing mutually opposed flat faces arranged for a direct and line engagement thereof by the sides of the tire while axially spaced from the mold, means directly cooperative between the matrix and the plates to provide a centered and fixed spacing of the said plate faces with respect to the tire such that said spacing equals the normal tire width when the tube is normally inflated, and means limiting the tire-expanding action of the supernormally inflated tube to the tire portion which is solely at and radially outwardly of the lines of engagement of the tire with the plates.

11. A structure in accordance with claim 10 wherein the last means comprises a laterally rigid ring member partitioning the interior space of the tire between its sides and having a width equal to the normal axial width of said space.

12. A structure in accordance with claim 10 wherein the last means comprises a radially collapsible rigid ring member extending across the interior space of the tire to engage the interior tire wall in lines opposite the bearing lines of the plates to prevent a distorting lateral compression of the tire thereat by the plates 13. In apparatus for recapping a pneumatic tire, a full circle mold openable in its plane for engaging solely the tread portion of a tire and extending axially for less than the full tire width, a frame fixedly mounting the mold in horizontal disposition, a plate element disposed opposite the under side of the mold and providing a flat bearing face for direct flat engagement with the under side face of a tire in the mold, means on the frame normally supporting the plate element in lowered position beneath the mold and coaxial therewith, a plate element similar to the first overlying the mold, a tension means for releasably connecting the plate elements to urge them toward each other, spacing members operative between the plate elements and the opposed sides of the closed mold and operatively engaging said elements and mold to provide a spacing between the tire-engageable plate element faces which is no less than the tire width when the tire is inflated for use, and means operative independently of the tension means to elevate the first plate member to the limit imposed by the spacing members therefor.

14. A structure in accordance with claim 13 wherein the spacing members comprise stepped blocks adjustably mounted on the plates for setting to engage the mold at different adjusted distances from the plates.

15. A structure in accordance with claim 13 wherein the spacing members comprise calibrated stop screws mounted on both plates.

16. A structure in accordance with claim 13 wherein the last means comprises a lift mechanism directly engaging the plate.

17. In apparatus for use in recapping a pneumatic tire containing an inflated tube for supernormal inflation during recapping, a vulcanizing mold having a heated matrix for peripherally engaging solely the tread portion of a tire in the mold and extending axially for less than the full normal tire width, plate elements disposed opposite the matrix and tire sides and providing mutually opposed flat faces arranged for a direct and line engagement thereof by the sides of the tire while axially spaced from the matrix, a laterally rigid ring member partitioning the interior space of the tire between its sides and having a width equal to the normal axial width of said space for its engagement with the tire interior in lines opposite the bearing lines of the plates, and means cooperative between the plates to positively and releasably engage them with the tire sides at their said bearing lines.

THOMAS P. BACON.